(12) United States Patent
Kim et al.

(10) Patent No.: US 8,576,683 B2
(45) Date of Patent: Nov. 5, 2013

(54) DISK DECISION METHOD AND OPTICAL DISK DRIVE USING THE DISK DECISION METHOD

(75) Inventors: Seung-hoon Kim, Yuseong-gu (KR); Kwan-ho Chun, Seoul (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 713 days.

(21) Appl. No.: 12/232,603

(22) Filed: Sep. 19, 2008

(65) Prior Publication Data
US 2009/0073836 A1    Mar. 19, 2009

(30) Foreign Application Priority Data
Sep. 19, 2007    (KR) .................. 10-2007-0095443

(51) Int. Cl.
*G11B 11/00*    (2006.01)
(52) U.S. Cl.
USPC .................. 369/53.23; 369/112.01
(58) Field of Classification Search
None
See application file for complete search history.

(56) References Cited

U.S. PATENT DOCUMENTS

| | | | | |
|---|---|---|---|---|
| 7,327,642 B2 * | 2/2008 | Yamada et al. | ............ | 369/44.29 |
| 7,558,178 B2 * | 7/2009 | Kurokawa et al. | ....... | 369/112.01 |
| 2003/0202437 A1 * | 10/2003 | Yamada et al. | ............ | 369/44.29 |
| 2005/0157614 A1 | 7/2005 | Ichimura et al. | | |
| 2007/0183278 A1 * | 8/2007 | Yamada et al. | ............ | 369/44.29 |
| 2008/0019224 A1 * | 1/2008 | Ishibashi | .................... | 369/30.03 |
| 2008/0056102 A1 * | 3/2008 | Yoo et al. | ................. | 369/112.26 |
| 2009/0073824 A1 * | 3/2009 | Kurozuka et al. | .......... | 369/44.23 |

FOREIGN PATENT DOCUMENTS

| | | |
|---|---|---|
| JP | 11-232655 | 8/1999 |
| JP | 11-288550 | 10/1999 |
| JP | 2000-228049 | 8/2000 |
| JP | 2003-91835 | 3/2003 |
| KR | 1999-0055522 | 7/1999 |
| KR | 10-2004-0084755 | 10/2004 |
| KR | 10-2006-0060619 | 6/2006 |
| KR | 10-2006-0112173 | 10/2006 |

OTHER PUBLICATIONS

Korean Office Action for corresponding Korean Patent Application No. 10-2007-0095443 dated Dec. 15, 2008 (5 pgs).

* cited by examiner

*Primary Examiner* — Paul Huber
(74) *Attorney, Agent, or Firm* — NSIP Law

(57) ABSTRACT

A method of determining the type of disk loaded on an optical disk drive, and an optical disk drive using the method are provided. The disk decision method includes operations of detecting a change in the magnitude of a focus error signal generated during a focus search for a recording layer of a disk closest to an outermost layer of the disk, wherein the change in the magnitude of the focus error signal depends on a change in a recording layer of the disk for which aberration correction is performed, and determining a recording layer architecture of the disk according to the detected change in the magnitude of the focus error signal.

22 Claims, 10 Drawing Sheets

DISK DECISION METHOD AND OPTICAL DISK DRIVE USING THE DISK DECISION METHOD

CROSS-REFERENCE TO RELATED APPLICATIONS

This application claims the benefit of Korean Patent Application No. 10-2007-0095443, filed on Sep. 19, 2007, in the Korean Intellectual Property Office, the disclosure of which is incorporated herein in its entirety by reference.

BACKGROUND

1. Field

The present invention relates to a method and apparatus for determining a type/architecture of a disk loaded on an optical disk drive.

2. Description of the Related Art

Optical disks, which are used as recording media of optical disk drives, can be classified as compact discs (CDs), digital versatile discs (DVDs), and next-generation discs such as Blue-ray discs (BDs). Data is recorded to and reproduced from BDs using a blue laser having a short wavelength, and thus BDs have a drastically increased storage capacity compared with DVDs. Recently, research into two-layered BDs and optical disk drives using the same has been actively conducted in order to further increase the data storage capacity of BDs.

In order to record data to or reproduce data from various types of optical disks, an optical disk drive needs to generate laser beams having different wavelengths according to the types of disks loaded thereon. In addition, a variety of parameter values for use in signal processing performed by optical disk drives needs to be set to adapt to the types of disks loaded on the optical disk drives.

Accordingly, every time a disk is loaded on an optical disk drive, the type of loaded disk needs to be determined.

Korean Patent Publication No. 1998-28839 discloses a technique of determining the type of disk. In Korean Patent Publication No. 1998-28839, the type of loaded disk is determined according to the length of time during which an S wave of a focus error signal appears, and single-layered disks and multi-layered disks can be discriminated from each other according to the number of S waves of the focus error signal.

However, when spherical aberration is a significant factor in optical disk drives, a small S wave for each recording layer is generated according to the amount of correction of the spherical aberration and accordingly can not be distinguished from noise. Thus, sometimes, an existing algorithm cannot handle this case. When noise is generated in a focus error signal due to, for example, vibrations or external disturbances when an actuator is driven for focus servo control, the noise may be misinterpreted as an S wave of the focus error signal. Therefore, a single-layered disk and a multi-layered disk may be wrongly discriminated from each other.

SUMMARY

Accordingly, it is an aspect of the present invention to provide a disk decision method by which the layer architecture of a disk is determined by detecting a change of a focus error signal according to a change of a layer for which spherical aberration correction is performed.

Accordingly, it is another aspect of the present invention to provide a disk decision method by which the type of disk and the layer architecture thereof are determined using a focus error signal which is generated during focus search.

Accordingly, it is still another aspect of the present invention to provide an optical disk drive which determines the type of disk and the layer architecture thereof by using a focus error signal which is generated during focus search.

Accordingly, it is another aspect of the present invention to provide a computer readable recording medium having recorded thereon a program code to perform a disk decision method by which the type of disk and the layer architecture thereof are determined using a focus error signal which is generated during focus search.

Additional aspects and/or advantages will be set forth in part in the description which follows and, in part, will be apparent from the description, or may be learned by practice of the invention.

The foregoing and/or other aspects are achieved by providing a disk reject change decision method comprising the operations of: detecting a change in a magnitude of a focus error signal generated during a focus search for a recording layer of a disk closest to an outermost layer of the disk, wherein the change in the magnitude of the focus error signal depends on a change in a recording layer of the disk for which aberration correction is performed; and determining a recording layer architecture of the disk according to the detected change in the magnitude of the focus error signal.

The aberration may comprise spherical aberration.

According to an aspect of the present invention, the operation of detecting the change in the magnitude of the focus error signal comprising the operations of: measuring a first magnitude of an S wave of the focus error signal, which is generated from the recording layer of the disk closest to the outermost layer thereof while moving an objective lens of a pickup in a direction perpendicular to a top surface of the disk, when the aberration correction has been performed for a first recording layer of a multi-layered disk; measuring a second magnitude of the S wave of the focus error signal, which is generated from the recording layer of the disk closest to the outermost layer thereof while moving the objective lens of the pickup in the direction perpendicular to the top surface of the disk, when the aberration correction has been performed for a second recording layer of a multi-layered disk; and determining a change in the magnitude of the focus error signal by comparing the first and second magnitudes.

According to another aspect of the present invention, the operation of detecting the change in the magnitude of the focus error signal comprising the operations of: adjusting a parameter so that a magnitude of an S wave of the focus error signal, which is generated from the recording layer of the disk closest to the outermost layer thereof while moving an objective lens of a pickup in a direction perpendicular to a top surface of the disk, becomes a target value when the aberration correction has been performed for a first recording layer of a multi-layered disk; measuring a magnitude of an S wave of the focus error signal, which is generated from the recording layer of the disk closest to the outermost layer thereof while moving the objective lens of the pickup in the direction perpendicular to the top surface of the disk, when the aberration correction has been performed for a second recording layer of a multi-layered disk; and determining the change in the magnitude of the focus error signal by comparing the measured magnitude of the focus error signal with the target value.

In the operation of determining the recording layer architecture of the disk, when the magnitude of the focus error signal generated during focus search from the outermost layer of the disk to the recording layer thereof closest to the outermost layer is greater when a second recording layer of a multi-layered disk is set as a recording layer for which spherical aberration correction is performed than when a first recording layer of the multi-layered disk is set as the recording layer for which spherical aberration correction is performed, the recording layer architecture of the disk is determined to be a multi-layered architecture, and otherwise, the recording layer architecture of the disk is determined to be a single-layered architecture.

According to another embodiment of the present invention, there is provided a disk decision method comprising the operations of: determining a type of a disk according to a time interval during which an S wave of a focus error signal detected while moving an objective lens of a pickup in a direction perpendicular to a top surface of the disk is generated, when a disk determination mode is enabled; and determining the recording layer architecture of the disk according to a change in the magnitude of the focus error signal, which is detected during a focus search for a recording layer of the disk closest to an outermost layer of the disk, wherein the change in the magnitude of the focus error signal depends on a change in the recording layer of the disk for which aberration correction is performed.

In the operation of determining the recording layer architecture of the disk, when the magnitude of the focus error signal generated during focus search from the outermost layer of the disk to the recording layer thereof closest to the outermost layer is greater when a second recording layer of a multi-layered disk is set as a recording layer for which spherical aberration correction is performed than when a first recording layer of the multi-layered disk is set as the recording layer for which spherical aberration correction is performed, the recording layer architecture of the disk is determined to be a multi-layered architecture, and otherwise, the recording layer architecture of the disk is determined to be a single-layered architecture.

The foregoing and/or other aspects are achieved by providing an optical disk drive to operate on a disk, the disk drive comprising a pickup comprising an objective lens, a signal processor, a disk type determination unit, a disk layer architecture determination unit, and controller. The pickup projects an optical signal to the disk via the objective lens and detects an optical signal reflected from the disk. The pickup further comprising an actuator which moves the position of the objective lens according to an actuator driving control signal and an aberration corrector which corrects aberration according to an aberration correction control signal. The signal processor processes optical signals detected by the pickup in order to generate a focus error signal. The disk type determination unit detects a time interval during which an S wave of the focus error signal is generated, and determining a type of the disk according to the detected time interval, when a disk determination mode is enabled. The disk layer architecture determination unit detects a change in a magnitude of the focus error signal, which is detected during a focus search for a recording layer of the disk closest to an outermost layer of the disk, and determines the recording layer architecture of the disk according to the detected change in the magnitude, wherein the change in the magnitude of the focus error signal depends on a change in the recording layer of the disk for which aberration correction is performed. The controller generates an actuator driving control signal to move the objective lens in a direction perpendicular to a top surface of the disk when a disk type determination mode is enabled, and generates an aberration correction control signal and an actuator driving control signal which are used to execute a focus search according to a change in a recording layer of the disk, for which aberration is corrected, when a disk layer architecture determination mode is enabled.

The aberration corrector may comprise a spherical aberration corrector.

The disk type determination unit comprises: an analog-to-digital conversion (ADC) unit converting an analog focus error signal into a digital focus error signal; an S-wave detection unit detecting a point of the digital focus error signal at which the S wave is generated; a time measuring unit measuring a time interval between a point of time at which the S wave is detected and a point of time at which a new S-wave is detected; and a comparison unit comparing the measured S-wave time interval with standard S-wave time intervals set for different types of disks so as to determine the type of loaded disk.

The disk layer architecture determination unit comprises: first and second registers an ADC unit converting the analog focus error signal into a digital focus error signal; an S wave magnitude detection unit detecting generation of the S wave by monitoring a point of the digital focus error signal at which the sign of the digital focus error signal is changed, and calculating the magnitude of the detected S wave; a first comparison unit comparing the calculated magnitude of the S wave with a critical value and storing information about the magnitude of a first S wave that exceeds the critical value in the first register, when the aberration corrector has corrected aberration for a first recording layer of a multi-layered disk, and comparing the calculated magnitude of the S wave with the critical value and storing information about the magnitude of a first S wave that exceeds the critical value in the second register, when the aberration corrector has corrected aberration for a second recording layer of a multi-layered disk, which is closer to the outermost layer of the disk than the first recording layer; and a second comparator comparing the magnitude information stored in the first register with the magnitude information stored in the second register, thereby determining the layer architecture of the loaded disk.

The foregoing and/or other aspects of the present invention, are achieved by providing a computer readable recording medium having recorded thereon a computer program code for a disk decision method by which the type of disk and layer architecture thereof are determined using a focus error signal which is generated during focus search.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Figure 1:
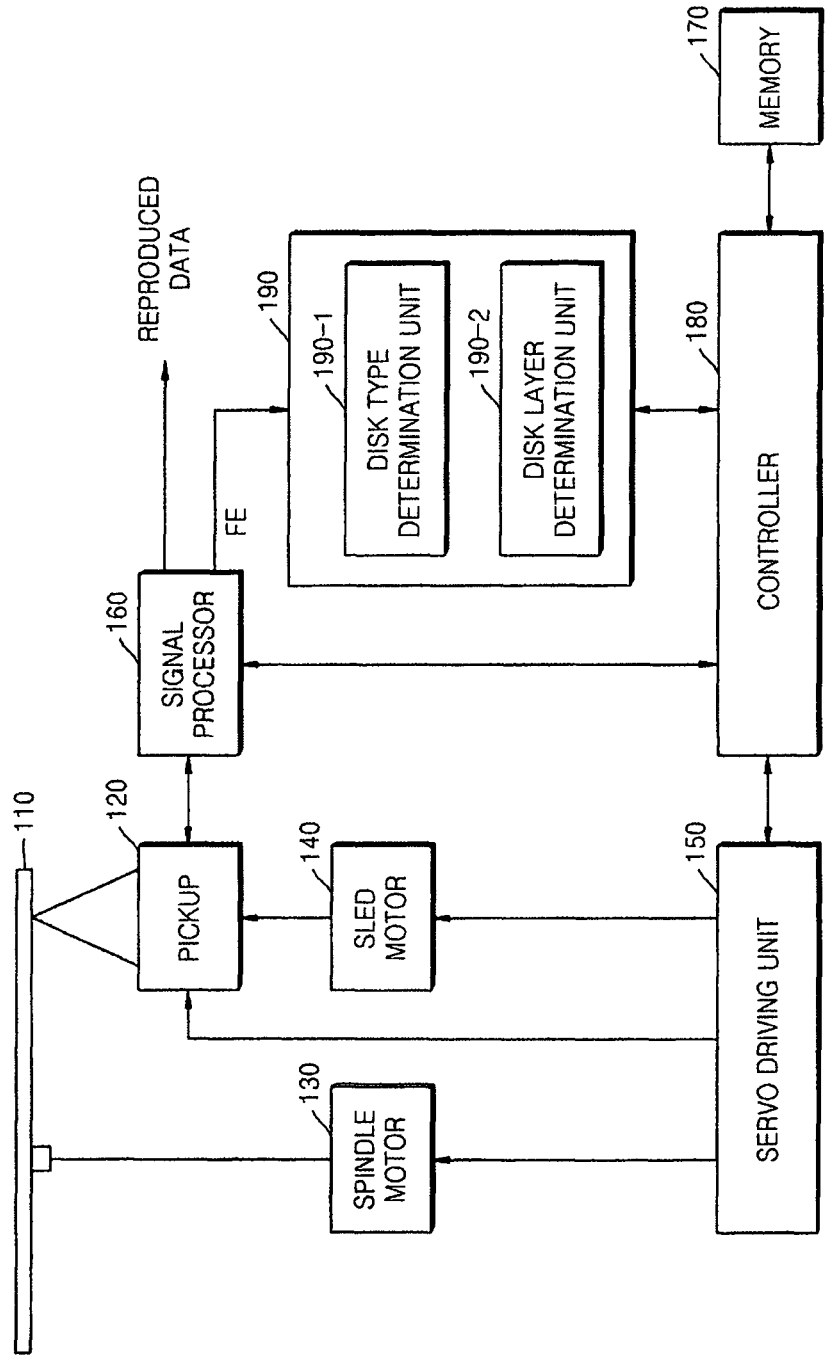
FIG. 1 is a block diagram of an optical disk drive according to an embodiment of the present invention.

Reference will now be made in detail to the embodiments, examples of which are illustrated in the accompanying drawings, wherein like reference numerals refer to the like elements throughout. The embodiments are described below to explain the present invention by referring to the figures.

FIG. 1 is a block diagram of an optical disk drive according to an embodiment of the present invention. Referring to FIG. 1, the optical disk drive according to the current embodiment of the present invention includes a disk 110, a pickup 120, a spindle motor 130, a sled motor 140, a servo driving unit 150, a signal processor 160, a memory 170, a controller 180, and a disk determination unit 190.

The disk 110, serving as a storage medium for use in optical disk drives, may be a compact disc (CD), a digital versatile disc (DVD), a Blue-ray disc (BD), or the like. In particular, BDs can be classified as BDs having a single-layered structure and BDs having a multi-layered structure. Regardless of the type of disk, all optical disks have the same thickness, that is, a thickness of 1.2 mm. However, optical disks have different distances from the outermost layers to recording layers according to the type of disk.

Figure 5A:
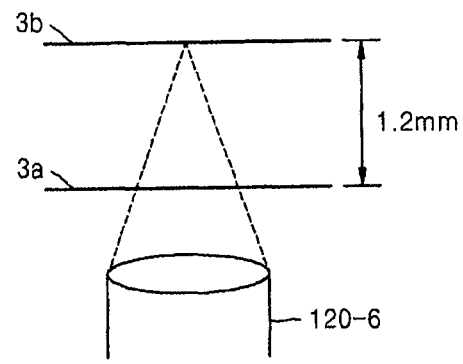
FIGS. 5A and 5B illustrate a cross-section of a compact disc (CD) and a waveform of a focus error signal during focus search, respectively.
Figure 6A:
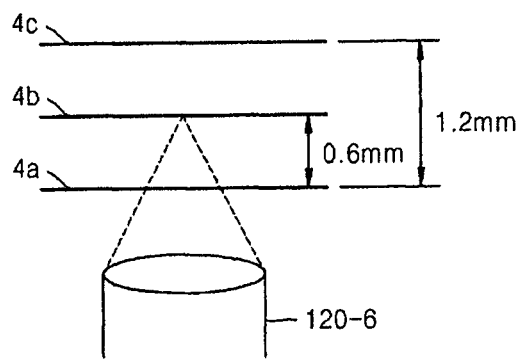
FIGS. 6A and 6B illustrate a cross-section of a digital versatile disc (DVD) and a waveform of a focus error signal during focus search, respectively.
Figure 7A:
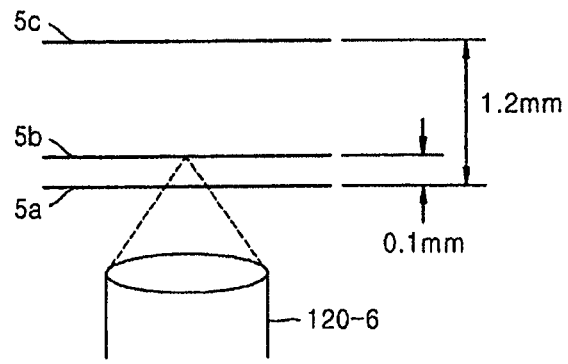
FIGS. 7A and 7B illustrate a cross-section of a single-layered Blue-ray disc (BD) and a waveform of a focus error signal during focus search, respectively.
Figure 8A:
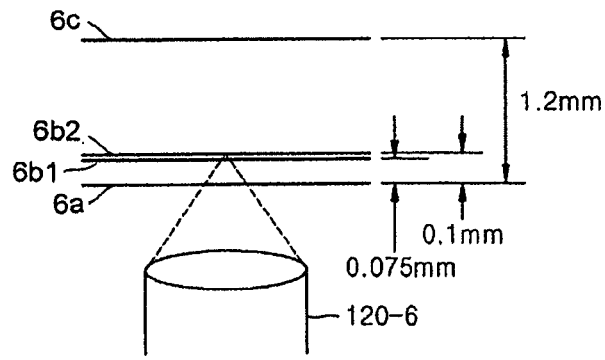
FIGS. 8A and 8B illustrate a cross-section of a dual-layered BD and a waveform of a focus error signal during focus search, respectively.

More specifically, as illustrated in FIG. 5A, a CD has a distance of 1.2 mm from an outermost layer $3a$ of the CD to a recording layer $3b$ thereof. As illustrated in FIG. 6A, a DVD has a distance of 0.6 mm from an outermost layer $4a$ of the DVD to a recording layer $4b$ thereof. As illustrated in FIG. 7A, a single-layered BD has a distance of 0.1 mm from an outermost layer $5a$ of the single-layered BD to a recording layer $5b$ thereof. As illustrated in FIG. 8A, a dual-layered BD has a distance of 0.1 mm from an outermost layer $6a$ of the dual-layered BD to a first recording layer $6b2$ thereof and a distance of 0.075 mm from the outermost layer $6a$ to a second recording layer $6b1$ of the dual-layered BD.

Figure 2:
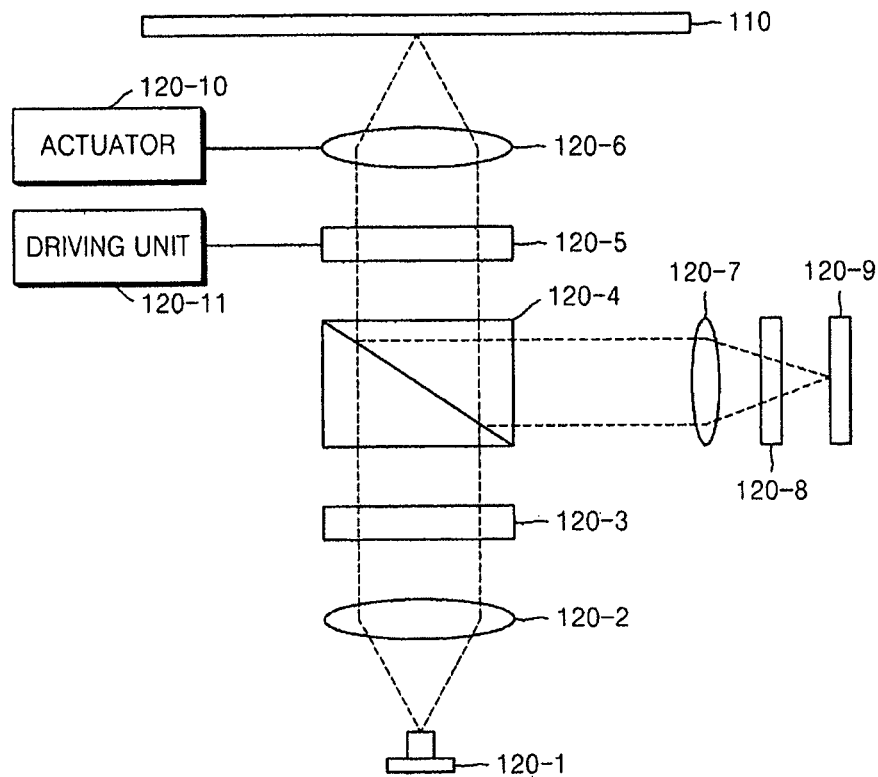
FIG. 2 is a detailed diagram of a pickup of the optical disk drive illustrated in FIG. 1, according to an embodiment of the present invention.

Referring back to FIG. 1, the pickup 120 projects an optical signal to the disk 110 and detects an optical signal reflected by the disk 110. FIG. 2 is a detailed diagram of the pickup 120, according to an embodiment of the present invention.

Referring to FIG. 2, the pickup 120 according to the current embodiment of the present invention includes a light source 120-1, a collimator lens 120-2, a diffraction grating 120-3, a polarization beam splitter 120-4, an aberration correction unit 120-5, an objective lens 120-6, a focusing lens 120-7, a multi-lens 120-8, an optical detector 120-9, an actuator 120-10, and a driving unit 120-11. The aberration correction unit 120-5 and the driving unit 120-11 together constitute an aberration corrector.

In an optical disk drive capable of recording data to or reproducing data from a CD, a DVD, and a BD, the light source 120-1 includes a light source unit for CDs that generates infrared light beams, a light source unit for DVDs that generates red light beams, and a light source unit for BDs that generates blue light beams. One of the three light source units is selected according to a result of a disk determination operation. One of the light source units is set as a default light source unit, before the disk determination operation is performed. For example, the light source unit for DVDs may be set as the default light source unit.

A light beam emitted from the light source 120-1 is irradiated to the collimator lens 120-2 and converted into parallel light rays thereby. In order to generate an error signal for servo control, the parallel light rays pass through the diffraction grating 120-3 for side spot generation, and are then incident upon the polarization beam splitter 120-4. Then, the polarization beam splitter 120-4 selects either S-wave light rays or P-wave light rays from the incident parallel light rays and emits the S-wave light rays or P-wave light rays to the aberration correction unit 120-5.

The aberration correction unit 120-5 denotes a unit for correcting a spherical aberration or a coma aberration. However, in the present embodiment, for convenience of explanation, the aberration correction unit 120-5 denotes a unit for correcting only spherical aberration. Of course, the present invention is not limited to this embodiment, and the aberration correction unit 120-5 may be designed to correct a variety of aberrations.

The aberration correction unit 120-5 to correct spherical aberration, may include a pair including a concave lens and a convex lens. In some cases, the aberration correction unit 120-5 is a liquid crystal device. When the aberration correction unit 120-5 includes a pair including a concave lens and a convex lens, it corrects spherical aberration by adjusting the interval between the concave lens and the convex lens.

In the present embodiment, spherical aberration is corrected by the convex and concave lenses, and the driving unit 120-11 controls the interval between the convex lens and the concave lens of the aberration correction unit 120-5.

The aberration-corrected S-wave light rays or P-wave light rays are incident upon the disk 110 via the objective lens 120-6.

Thereafter, the S-wave light rays or P-wave light rays incident upon the disk 110 are reflected by the disk 110 back to the objective lens 120-6, and are then incident upon the multi-lens 120-8 via the aberration correction unit 120-5, the polarization beam splitter 120-4, and the focusing lens 120-7.

The multi-lens 120-8 has a structure capable of detecting a focus error signal and a tracking error signal from the incident light by so-called astigmatism.

The optical detector 120-9 includes a plurality of photodiodes (not shown) arranged according to a structure required to generate a focus error signal and a tracking error signal. The photodiodes convert incident optical signals into electrical signals.

The actuator 120-10 performs focus control by vertically moving the objective lens 120-6 according to a focus control signal, or performs tracking control by horizontally moving the objective lens 120-6 according to a tracking control signal.

Referring back to FIG. 1, the signal processor 160 generates a sum signal, a focus error signal FE, and a tracking error signal by processing the signals output by the optical detector 120-9 of the pickup 120, and performs a series of signal processing operations for restoring the data by processing the sum signal. The sum signal denotes a sum of all of the signals output by the optical detector 120-9. The signal processor 160 includes amplification circuits in order to generate the focus error signal. The gains of the amplification circuits are determined by the controller 180.

The controller 180 controls all of the components of the optical disk drive and performs a series of disk determination control operations of: generating an actuator driving control signal for moving the objective lens 120-6 of the pickup 120 in a direction perpendicular to the top surface of the disk 110 when a disk type determination mode is enabled; and generating an aberration correction control signal and an actuator driving control signal which are used to execute a focus search according to a change in a recording layer of the disk 110, for which aberration is corrected, when a disk layer architecture determination mode is enabled. The controller 180 includes hardware and software for performing the methods illustrated in FIGS. 9 through 11. Disk determination control operations of the controller 180 will be described later in greater detail with reference to FIGS. 9 through 11.

The servo driving unit 150 generates driving signals for driving the spindle motor 130 and the sled motor 140, on the basis of a variety of control signals received from the controller 180. In addition, the servo driving unit 150 generates a driving signal for driving the actuator 120-10 of the pickup 120 in order to control focusing and tracking, and a driving signal for driving the driving unit 120-11 of the pickup 120 in order to control aberration correction.

The spindle motor 130 rotates the disk 110, and the sled motor 140 moves the pickup 120 over the disk 110.

The memory 170 stores programs and parameters which are required to control the optical disk drive, and also information required for disk determination.

The disk determination unit 190 includes a disk type determination unit 190-1 and a disk layer architecture determination unit 190-2.

In order to determine a disk type, the disk type determination unit 190-1 detects a time interval during which an S wave of the focus error signal FE is generated, and determines the type of disk on the basis of the detected time interval. In order to determine a disk layer architecture, the disk layer architecture determination unit 190-2 detects a change in the magnitude of the focus error signal FE caused during focus search for a recording layer of the disk 110 closest to an outermost layer thereof according to a change of a recording layer for which aberration is corrected, and determines the recording layer architecture of the disk 110 on the basis of the detected change in the magnitude of the focus error signal FE.

For reference, an S-wave generation duration for each type of disk during focus search is as follows.

Figure 5B:
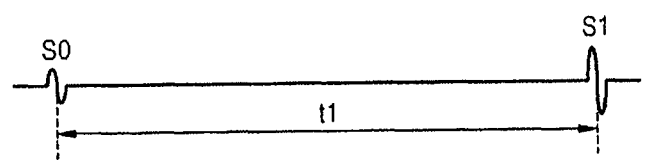

First, when the disk 110 loaded on the optical disk drive is a CD, the distance between the outermost layer 3a of the CD and the recording layer 3b thereof is 1.2 mm as illustrated in FIG. 5A. Accordingly, referring to FIG. 5B, a time interval t1 between an S wave S0 generated in the outermost layer 3a and an S wave S1 generated in the recording layer 3b corresponds to the time required to move the objective lens 120-6 by 1.2 mm during focus search.

Figure 6B:
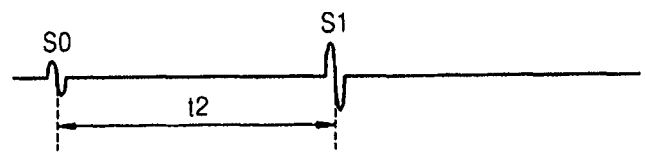

Second, when the disk 110 loaded on the optical disk drive is a DVD, a distance between the outermost layer 4a of the DVD and the recording layer 4b thereof is 0.6 mm and a distance between the outermost layer 4a and a label layer 4c is 1.2 mm, as illustrated in FIG. 6A. Accordingly, referring to FIG. 6B, a time interval t2 between an S wave S0 generated in the outermost layer 4a and an S wave S1 generated in the recording layer 4b corresponds to the time taken to move the objective lens 120-6 by 0.6 mm during focus search.

Figure 7B:

Third, when the disk 110 loaded on the optical disk drive is a single-layered BD, a distance between the outermost layer 5a of the single-layered BD and the recording layer 5b thereof is 0.1 mm and a distance between the outermost layer 5a and a label layer 5c is 1.2 mm, as illustrated in FIG. 7A. Accordingly, referring to FIG. 7B, a time interval t3 between an S wave S0 generated in the outermost layer 5a and an S wave S1 generated in the recording layer 5b corresponds to the time taken to move the objective lens 120-6 by 0.1 mm during focus search.

Figure 8B:
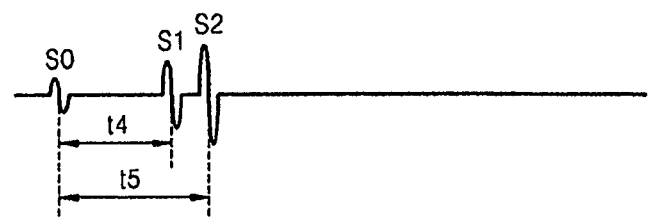

Fourth, when the disk 110 loaded on the optical disk drive is a dual-layered BD, a distance between the outermost layer 6a of the dual-layered BD and the first recording layer 6b2 thereof is 0.1 mm, a distance between the outermost layer 6a and the second recording layer 6b1 thereof is 0.075 mm, and a distance between the outermost layer 6a and a label layer 6c is 1.2 mm, as illustrated in FIG. 8A. Accordingly, referring to FIG. 8B, a time interval t4 between an S wave S0 generated in the outermost layer 6a and an S wave S1 generated in the second recording layer 6b1 corresponds to the time taken to move the objective lens 120-6 by 0.075 mm during focus search, and a time interval t5 between an S wave S0 generated in the outermost layer 6a and an S wave S1 generated in the first recording layer 6b2 corresponds to the time taken to move the objective lens 120-6 by 0.1 mm during focus search.

Accordingly, a time interval between an S wave generated in the outermost layer of a disk and an S wave generated in a recording layer thereof which is closest to the outermost layer differs greatly between a CD, a DVD, and a BD. However, a time interval between an S wave generated in the outermost layer of a disk and an S wave generated in a recording layer thereof which is closest to the outermost layer is slightly different between a single-layered BD and a dual-layered BD.

Thus, on the basis of the time interval between S waves, a determination as to whether a loaded disk is either a CD, a DVD, or a BD is made by the disk type determination unit 190-1, and a determination as to whether the layer architecture of a loaded disk is single-layered or multi-layered is made by the disk layer architecture determination unit 190-2.

Figure 3:
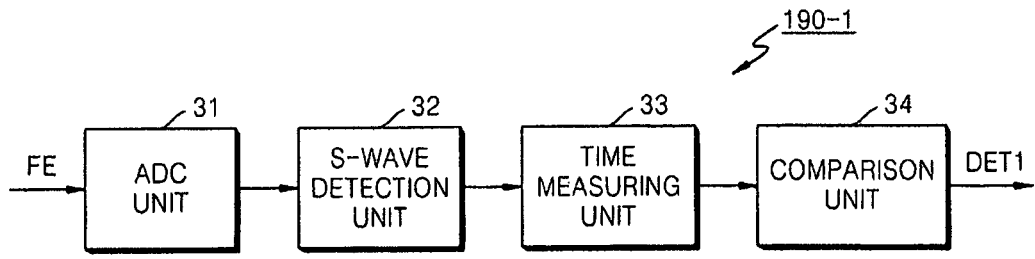
FIG. 3 is a block diagram of a disk type determination unit of the optical disk drive illustrated in FIG. 1, according to an embodiment of the present invention.

First, a method of determining the type of disk will be described. FIG. 3 is a block diagram illustrating a detailed structure of the disk type determination unit 190-1, according to an embodiment of the present invention.

Referring to FIG. 3, the disk type determination unit 190-1 according to the current embodiment of the present invention includes an analog-to-digital conversion (ADC) unit 31, an S-wave detection unit 32, a time measuring unit 33, and a comparison unit 34.

The disk type determination unit 190-1 is enabled only when a disk type determination mode is enabled, that is, the disk type determination unit 190-1 is disabled in other modes. For example, the disk type determination mode starts when the disk 110 is loaded on the optical disk drive or when the optical disk drive is turned on with the disk 110 loaded thereon, and is maintained during a focus search to determine the type of disk.

For reference, when a focus search mode is enabled, the controller 180 generates a control signal enabling the disk type determination unit 190-1 and an actuator driving control signal moving the objective lens 120-6 of the pickup 120 in a direction perpendicular to the top surface of the disk 110.

When the disk type determination unit 190-1 is enabled, the ADC unit 31 converts an analog focus error signal FE received from the signal processor 160 to a digital focus error signal.

The S-wave detection unit 32 detects a portion of the digital focus error signal where an S wave is generated, by detecting a point at which the sign of the digital focus error signal is changed. For example, a point in time at which the sign of the digital focus error signal changes to negative after exceeding a positive value equal to or greater than a specific value is determined to be an S-wave generation point in time.

An S wave of a focus error signal during focus search is generated on the outermost layer of a disk and on a recording layer thereof. In other words, in the case of single-layered disks, two S waves are generated. In the case of dual-layered disks, three S waves are generated.

The time measuring unit 33 measures a time interval between an S wave generated in the outermost layer of the disk 110 and an S wave generated in a recording layer thereof which is closest to the outermost layer. For example, clock pulses generated between a point in time at which a first S wave is generated and a point in time at which a second S wave is generated may be counted in order to measure the time interval.

The comparison unit 34 compares the measured time interval between S waves with pieces of information about standard time intervals for different types of disks read from the memory 170, to thereby determine the type of loaded disk 110. In other words, the comparison unit 34 determines, as the type of loaded disk 110, a disk type having information representing a standard time interval closest to the measured time interval, and outputs a first determination signal DET1 indicating the determined disk type to the controller 180.

The controller 180 selects one of the light source units included in the light source 120-1 of the pickup 120 and various parameters for use in signal processing, according to the disk type indicated by the input first determination signal DET1.

In addition, the controller 180 enables the disk layer architecture determination unit 190-2 when the disk type indicated by the first determination signal DET1 is a BD, and enables the disk layer architecture determination mode. In some cases, the controller 180 may be designed to automatically enable the disk layer architecture determination unit 190-2 when the first determination signal DET1 is generated. In other words, the controller 180 may be designed to enable the disk layer architecture determination unit 190-2 regardless of the type of disk.

Figure 4:
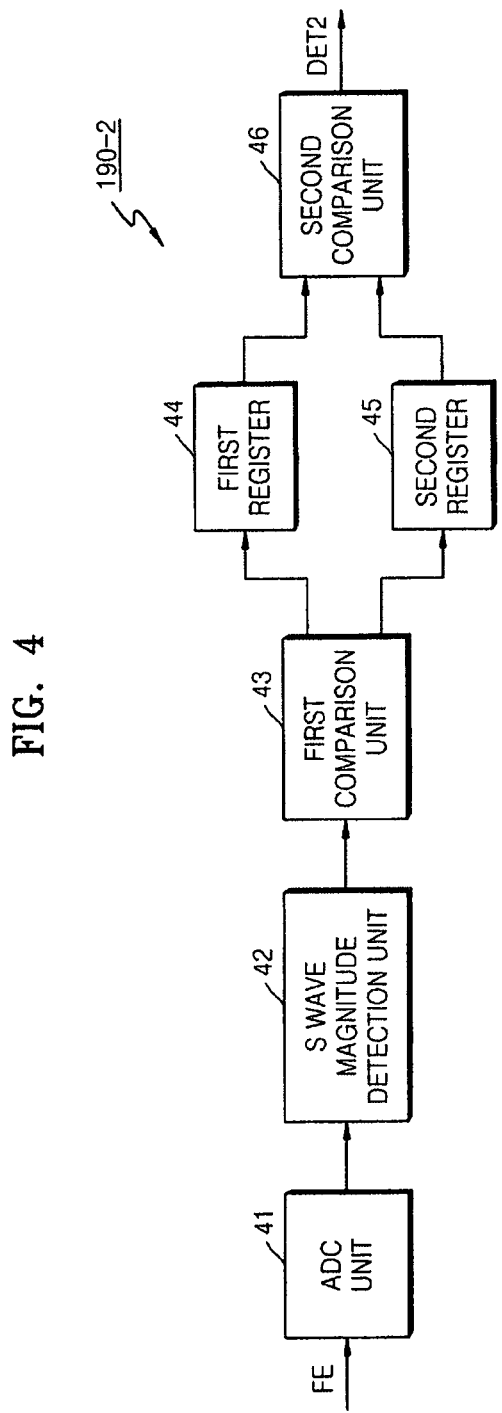
FIG. 4 is a block diagram of a disk layer architecture determination unit of the optical disk drive illustrated in FIG. 1, according to an embodiment of the present invention.

FIG. 4 is a block diagram of the disk layer architecture determination unit 190-2 of the optical disk drive illustrated in FIG. 1, according to an embodiment of the present invention. Referring to FIG. 4, the disk layer architecture determination unit 190-2 according to the current embodiment of the present invention includes an ADC unit 41, an S wave magnitude detection unit 42, first and second comparison units 43 and 46, and first and second registers 44 and 45.

In the disk layer architecture determination mode, the controller 180 generates a layer aberration correction control signal in order for aberration correction to be primarily performed for a first recording layer of a multi-layered disk. In the dual-layered BD illustrated in FIG. 8A, a recording layer 0.1 mm away from the outermost layer is defined as a first recording layer, and a recording layer 0.075 mm away from the outermost layer is defined as a second recording layer.

Thereafter, the controller 180 generates an actuator driving control signal for performing focus search for a recording layer of the disk 110 closest to the outermost layer thereof. Accordingly, the objective lens 120-6 of the pickup 120 starts moving in a direction perpendicular to the top surface of the disk 110.

When the disk layer architecture determination unit 190-2 is enabled, the ADC unit 41 converts the analog focus error signal FE received from the signal processor 160 into a digital focus error signal.

The S wave magnitude detection unit 42 detects generation of S waves by monitoring a location on the digital focus error signal where the sign is changed, and calculates the magnitude of the detected S waves. In other words, the S wave magnitude detection unit 42 calculates the magnitudes of the S waves by obtaining a difference between the maximum and minimum values of each of the S waves.

Figure 12A:
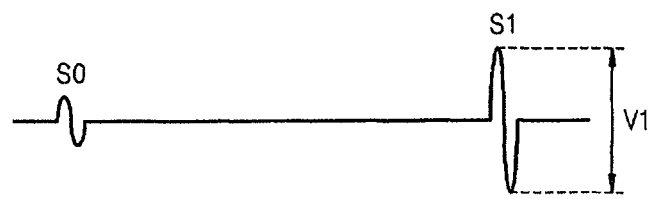
FIG. 12A illustrates a waveform of a focus error signal generated during focus search in a single-layered disk when aberration correction has been performed for a first recording layer of a multi-layered disk, according to an embodiment of the present invention.
Figure 12B:
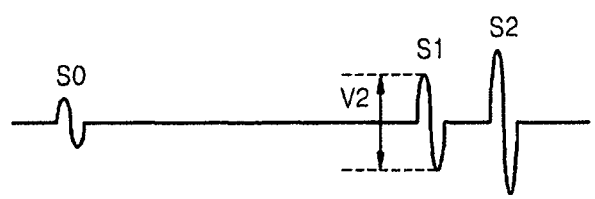
FIG. 12B illustrates a waveform of a focus error signal generated during focus search in a dual-layered disk when aberration correction has been performed for the first recording layer of the multi-layered disk, according to an embodiment of the present invention.

FIG. 12A illustrates a waveform of a focus error signal generated during focus search in a single-layered disk when aberration correction has been performed for a first recording layer of a multi-layered disk standard, according to an embodiment of the present invention, and FIG. 12B illustrates a waveform of a focus error signal generated during focus search in a dual-layered disk when aberration correction has been performed for the first recording layer of the multi-layered disk standard, according to an embodiment of the present invention.

Referring to FIG. 12A, S0 denotes an S wave generated in the outermost layer of the single-layered disk, and S1 denotes an S wave generated in the single recording layer of the single-layered disk.

Referring to FIG. 12B, S0 denotes an S wave generated in the outermost layer of the dual-layered disk, S1 denotes an S wave generated in a second recording layer of the dual-layered disk, and S2 denotes an S wave generated in a first recording layer of the dual-layered disk. Since aberration correction has been performed for the first recording layer of the multi-layered disk, the S wave S2 has a greater magnitude than the S wave S1 as illustrated in FIG. 12B.

Referring back to FIG. 4, the first comparison unit 43 compares the magnitudes of the S waves calculated by the S wave magnitude detection unit 42 with an initially set critical value, and transmits information about the magnitude of a first S wave of the S waves that exceeds the critical value to the first register 44. The critical value is determined to be greater than the magnitude of the S wave S0 of a focus error signal generated by an optical signal reflected by the outermost layer of the disk and to be less than the magnitude of an S wave of the focus error signal generated by an optical signal reflected by a recording layer of the disk, in order to ignore the S wave S0 generated from the outermost layer of the disk and detect only the magnitude of the S wave generated by the recording layer.

After the first register 44 stores the information about the magnitude of the first S wave that exceeds the critical value, the controller 180 controls the objective lens 120-6 to move to an initialization position, and then generates a layer aberration correction control signal in order for aberration correction to be performed for a second recording layer of the multi-layered disk.

Thereafter, the controller 180 re-generates the actuator driving control signal for performing a focus search for the recording layer of the disk closest to the outermost layer thereof.

Then, the S wave magnitude detection unit 42 detects generation of S waves by monitoring a point at which the sign of the digital focus error signal obtained by the ADC unit 41 changes, and calculates the magnitudes of the detected S waves. In other words, the S wave magnitude detection unit 42 calculates the magnitudes of the S waves by obtaining a difference between the maximum and minimum values of each of the S waves.

Figure 13A:
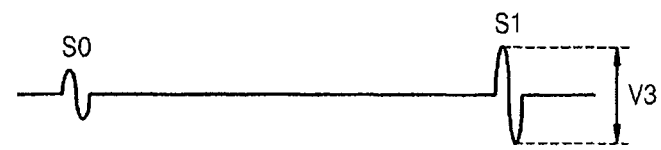
FIG. 13A illustrates a waveform of a focus error signal generated during focus search in the single-layered disk when aberration correction has been performed for a second recording layer of a multi-layered disk standard, according to an embodiment of the present invention.
Figure 13B:
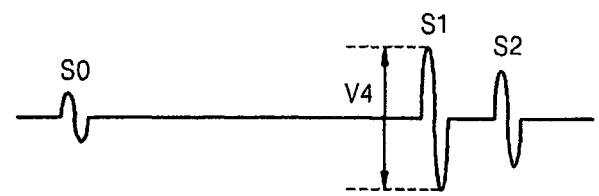
FIG. 13B illustrates a waveform of a focus error signal generated during focus search in the dual-layered disk when aberration correction has been performed for the second recording layer of the multi-layered disk standard, according to an embodiment of the present invention.

FIG. 13A illustrates a waveform of a focus error signal generated during focus search in the single-layered disk when aberration correction has been performed for a second recording layer of a multi-layered disk standard, according to an embodiment of the present invention, and FIG. 13B illustrates a waveform of a focus error signal generated during focus search in the dual-layered disk when aberration correction has been performed for the second recording layer of the multi-layered disk standard, according to an embodiment of the present invention.

Thereafter, the first comparison unit 43 compares the magnitudes of the S waves calculated by the S wave magnitude detection unit 42 with an initially set critical value, and transmits information about the magnitude of a first S wave of the S waves that exceeds the critical value to the second register 45.

Accordingly, the first register 44 stores the information about the magnitude of the first S wave of the focus error signal, which exceeds the critical value when aberration correction has been performed for the first recording layer of the multi-layered disk. The second register 45 stores the information about the magnitude of the first S wave of the focus error signal, which exceeds the critical value when the aberration correction has been performed for the second recording layer of the multi-layered disk, wherein the second recording layer is closer to the outermost layer than the first recording layer.

For reference, when a single-layered disk is loaded and a recording layer for which aberration correction is performed is changed from the first recording layer to the second recording layer, the first S wave S1 of the focus error signal, which exceeds the critical value, is generated in the first recording layer, which is the single recording layer, and thus the magnitude of the first S wave S1 is reduced.

However, when a dual-layered disk is loaded and a recording layer for which aberration correction is performed is changed from the first recording layer to the second recording layer, the first S wave S1 of the focus error signal, which exceeds the critical value, is generated in the second recording layer and thus the magnitude of the first S wave S1 is increased.

On the basis of the above-described characteristics, the second comparator 46 compares the information stored in the first register 44 with the information stored in the second register 45, thereby determining a layer architecture of the disk 110.

More specifically, the second comparator 46 compares the magnitude information stored in the first register 44 with the magnitude information stored in the second register 45, and determines the layer architecture of the loaded disk 110 to be a multi-layered disk when the magnitude represented by the magnitude information stored in the second register 45 is greater than the magnitude represented by the magnitude information stored in the first register 44 and, otherwise, determines the disk layer architecture to be a single-layered disk. Then, the second comparator 46 outputs a second determination signal DET2, which indicates the determined disk layer architecture, to the controller 180. Accordingly, the controller 180 controls the components of the optical disk drive in accordance with the determined disk layer architecture.

According to another embodiment of the present invention, when aberration correction has been performed for a first recording layer of a multi-layered disk, the controller 180 may optionally control the gain of a focus error signal processing amplifier (not shown) included in the signal processor 160 so that the magnitude of an S wave of a focus error signal, which is generated from a recording layer of the loaded disk 110 closest to the outermost layer thereof while moving the objective lens 120-6 of the pickup 120 in a direction perpendicular to the top surface of the disk 110, can become a target value.

Figure 9:
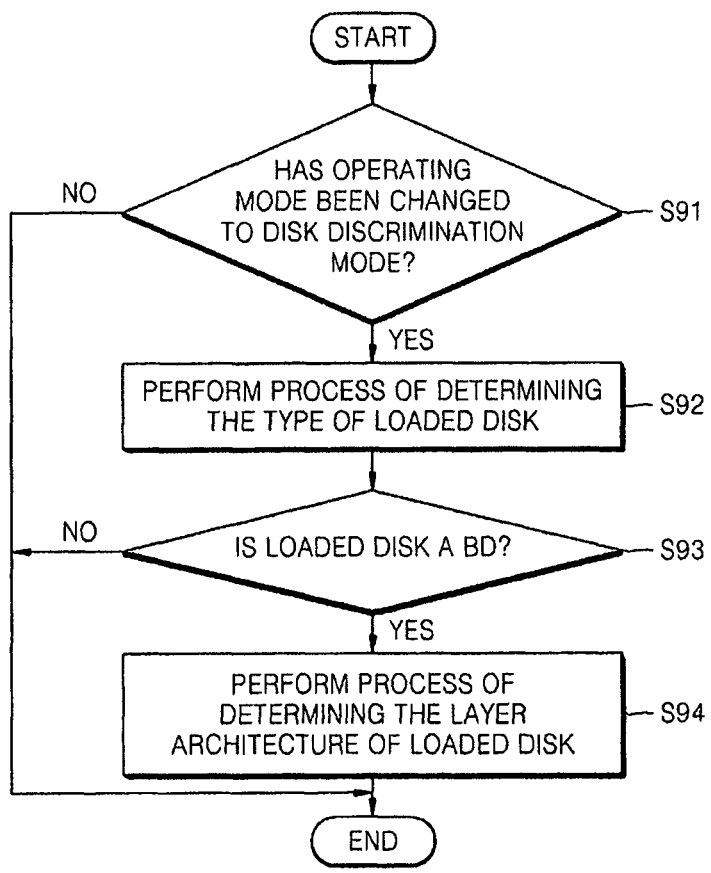
FIG. 9 is a flowchart of a disk decision method using the optical disk drive of FIG. 1, according to an embodiment of the present invention.

FIG. 9 is a flowchart of a disk decision method using the optical disk drive of FIG. 1, according to an embodiment of the present invention.

Referring to FIG. 9, first, in operation S91, the optical disk drive determines whether an operating mode has been changed to a disk determination mode. For example, the disk determination mode may be enabled when the disk 110 is loaded on the optical disk drive or when the optical disk drive having the disk 110 loaded thereon is turned on.

If it is determined in operation S91 that the operating mode has been changed to the disk determination mode, the optical disk drive performs a process in order to determine the type of loaded disk 110, in operation S92. The type of loaded disk 110 may be determined according to a time interval during which an S wave of a focus error signal detected while the objective lens 120-6 of the pickup 120 is moving in a direction perpendicular to the top surface of the disk 110 is being generated. The determination of the type of loaded disk 110 has already been described above in detail, so a description thereof will not be repeated.

In operation S93, it is determined whether the loaded disk 110 is a BD. If it is determined in operation S93 that the loaded disk 110 is a BD, a process of determining the layer architecture of the loaded disk 110 is performed, in operation S94.

For reference, when the layer architecture of a loaded DVD needs to be determined, operation S93 is changed to an operation of determining whether the loaded disk 110 is a DVD or a BD. In some cases, operation 93 may be omitted.

Embodiments of the process of determining a disk layer architecture will now be described with reference to the flowcharts of FIGS. 10 and 11.

Figure 10:
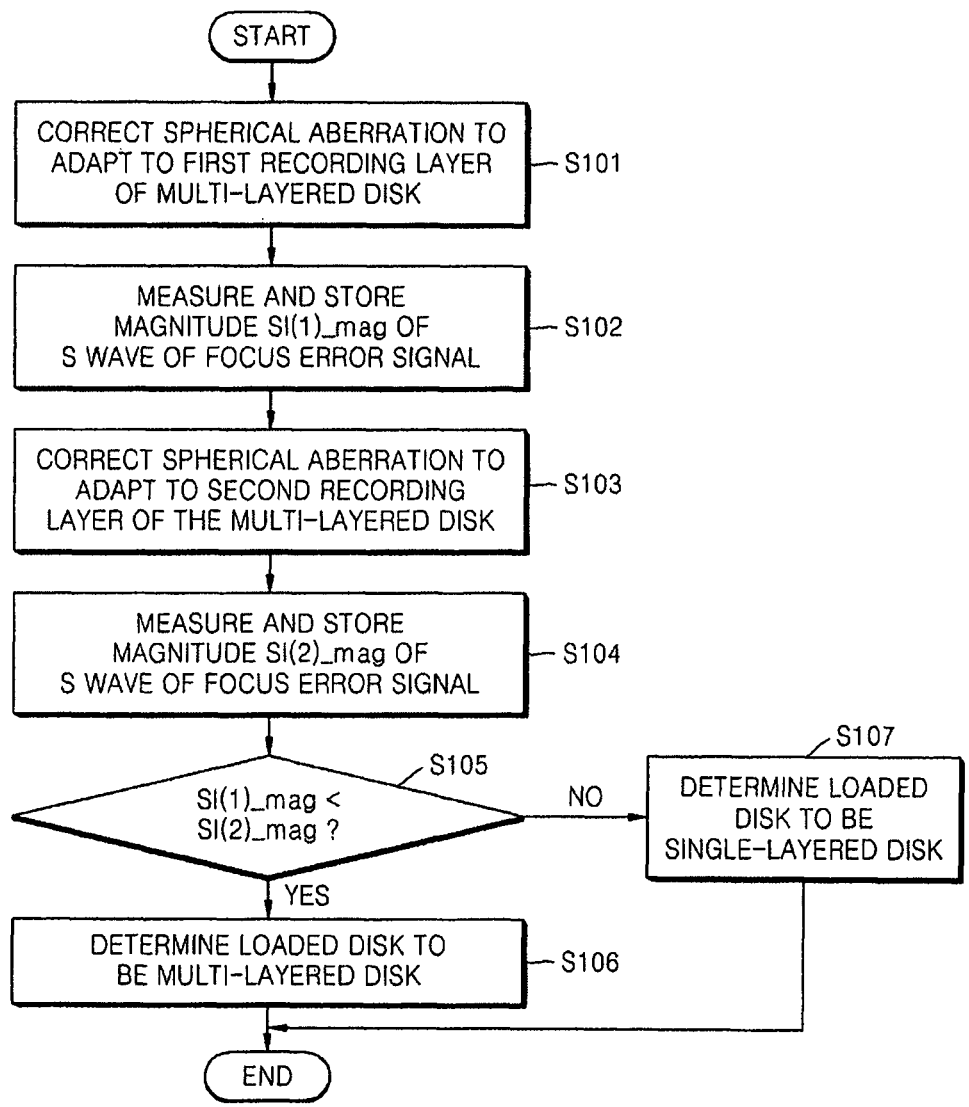
FIG. 10 is a flowchart illustrating a method of determining the layer architecture of a disk, according to an embodiment of the present invention.

FIG. 10 is a flowchart illustrating a method of determining the layer architecture of a disk using the optical disk drive of FIG. 1, according to an embodiment of the present invention.

First, in operation S101, spherical aberration is corrected to adapt to a first recording layer of a multi-layered disk.

Thereafter, in operation S102, a magnitude S1(1)_mag of an S wave of a focus error signal generated from a recording layer of the disk 110 closest to the outermost layer thereof when the objective lens 120-6 of the pickup 120 is moving in a direction perpendicular to the top surface of the disk 110 is measured and stored. When the loaded disk 110 is a single-layered disk, the magnitude S1(1)_mag is V1 illustrated in FIG. 12A. When the loaded disk 110 is a dual-layered disk, the magnitude S1(1)_mag is V2 illustrated in FIG. 12B.

In operation S103, spherical aberration is corrected to adapt to a second recording layer of the multi-layered disk.

Thereafter, in operation S104, a magnitude S1(2)_mag of an S wave of a focus error signal generated from a recording layer of the disk 110 closest to the outermost layer thereof when the objective lens 120-6 of the pickup 120 is moving in a direction perpendicular to the top surface of the disk 110 is measured and stored. When the loaded disk 110 is a single-layered disk, the magnitude S1(2)_mag is V3 illustrated in FIG. 13A. When the loaded disk 110 is a dual-layered disk, the magnitude S1(2)_mag is V4 illustrated in FIG. 13B.

Next, in operation S105, the stored magnitudes S1(1)_mag and S1(2)_mag are compared with each other.

In operation S106, when the magnitude S1(2)_mag is greater than the magnitude S1(1)_mag, the loaded disk 110 is determined to be a multi-layered disk. In operation S107, when the magnitude S1(2)_mag is less than or equal to the magnitude S1(1)_mag, the loaded disk 110 is determined to be a single-layered disk.

For reference, when the loaded disk 110 is a single-layered disk and a recording layer for which spherical aberration is performed is changed from the first recording layer to the second recording layer, the S wave S1 of the focus error signal, which is generated from a recording layer of the disk 110 closest to the outermost layer thereof, is generated in the first recording layer, which is the single recording layer, and thus the magnitude of the S wave S1 is reduced from V1 to V3 as illustrated in FIGS. 12A and 13A.

On the other hand, when the loaded disk 110 is a dual-layered disk and a recording layer for which spherical aberration is performed is changed from the first recording layer to the second recording layer, the first S wave S1 of the focus error signal is generated in the second recording layer and thus the magnitude of the S wave S1 is increased from V2 to V4 as illustrated in FIGS. 12B and 13B.

Figure 11:
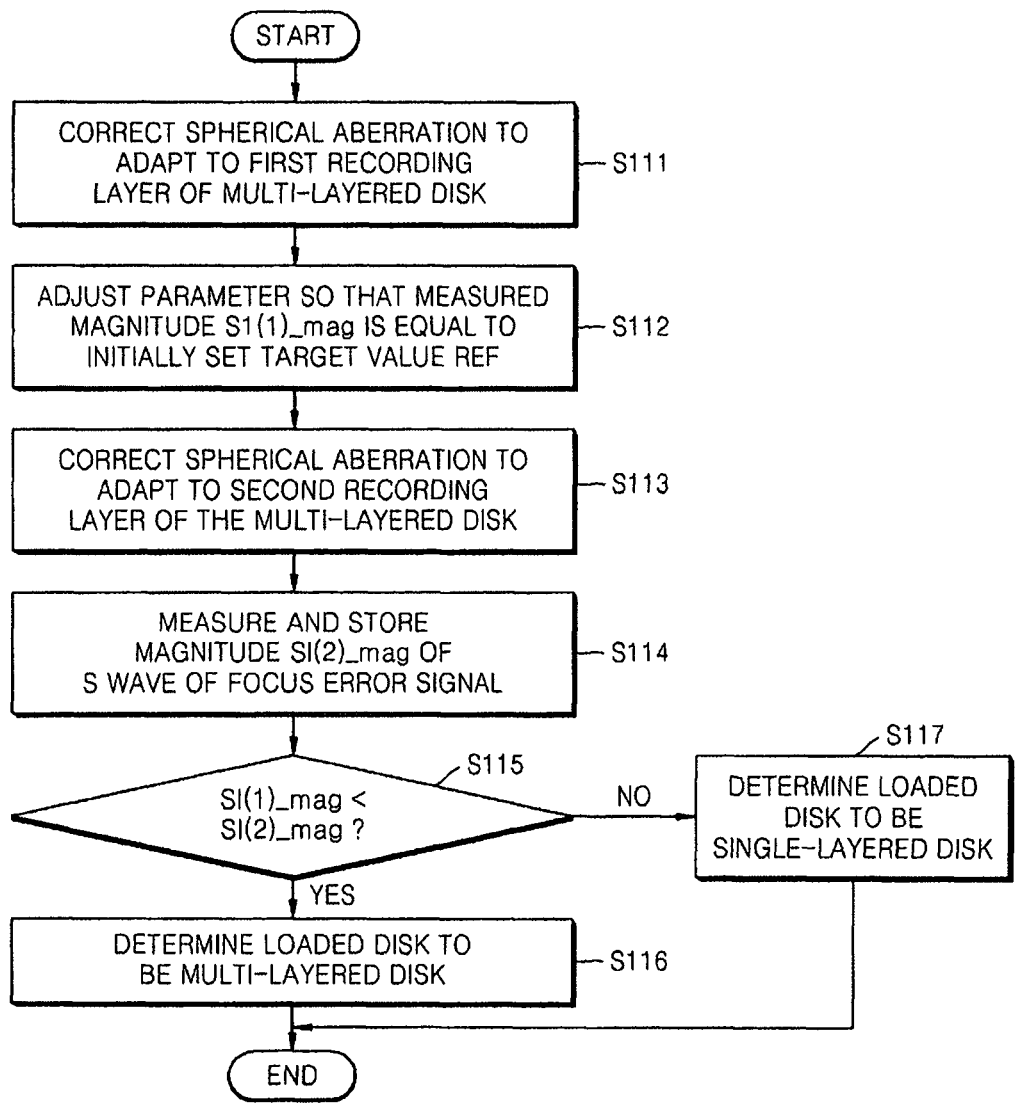
FIG. 11 is a flowchart illustrating a method of determining the layer architecture of a disk, according to another embodiment of the present invention.

FIG. 11 is a flowchart illustrating a method of determining the layer architecture of a disk using the optical disk drive of FIG. 1, according to another embodiment of the present invention.

First, in operation S111, spherical aberration correction for a first recording layer of a multi-layered disk is performed.

Thereafter, in operation S112, a magnitude S1(1)_mag of an S wave of a focus error signal generated from a recording layer of the disk 110 closest to the outermost layer thereof when the objective lens 120-6 of the pickup 120 is moving in a direction perpendicular to the top surface of the disk 110 is measured, and a parameter associated with the magnitude of the focus error signal is adjusted so that the measured magnitude S1(1)_mag is equal to an initially set target value REF. For example, the parameter associated with the magnitude of the focus error signal may be a parameter that determines the gain of an amplifier for amplifying the focus error signal. The reason why the parameter is adjusted so that the measured magnitude S1(1)_mag is equal to the initially set target value REF is that if the measured magnitude S1(1)_mag is far greater or less than the initially set target value REF, an error may be generated during determination.

Figure 14A:
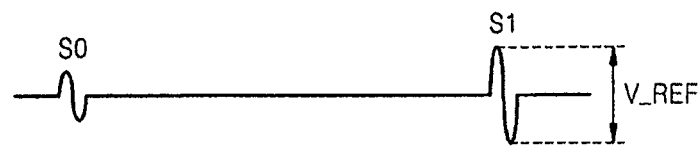
FIG. 14A illustrates a waveform of a focus error signal generated during focus search in a single-layered disk when aberration correction has been performed for a first recording layer of a multi-layered disk, according to another embodiment of the present invention.
Figure 14B:
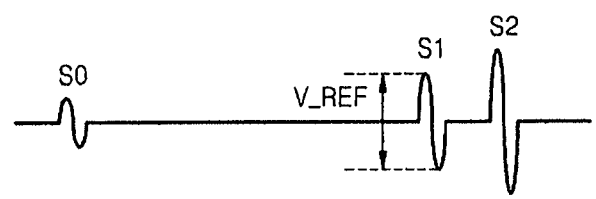
FIG. 14B illustrates a waveform of a focus error signal generated during focus search in a dual-layered disk when aberration correction has been performed for the first recording layer of the multi-layered disk, according to another embodiment of the present invention.

Accordingly, regardless of a layer architecture of a loaded disk, the magnitude S1(1)_mag is V_REF as illustrated in FIGS. 14A and 14B.

In operation S113, spherical aberration correction for a second recording layer of the multi-layered disk is performed.

Figure 15A:
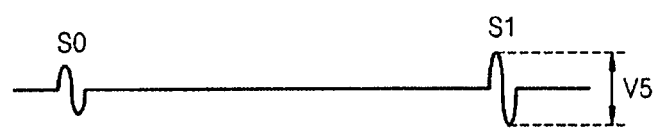
FIG. 15A illustrates a waveform of a focus error signal generated during focus search in the single-layered disk when aberration correction has been performed for a second recording layer of the multi-layered disk, according to another embodiment of the present invention.
Figure 15B:
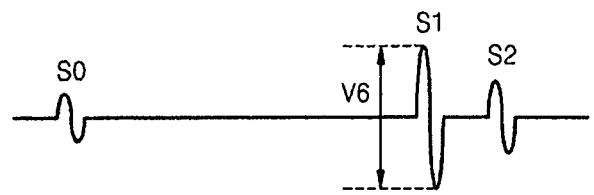
FIG. 15B illustrates a waveform of a focus error signal generated during focus search in the dual-layered disk when aberration correction has been performed for a second recording layer of the multi-layered disk, according to another embodiment of the present invention.

Thereafter, in operation S114, a magnitude S1(2)_mag of an S wave of a focus error signal generated from a recording layer of the disk 110 closest to the outermost layer thereof when the objective lens 120-6 of the pickup 120 is moving in a direction perpendicular to the top surface of the disk 110 is measured and stored. When the loaded disk 110 is a single-layered disk, the magnitude S1(2)_mag is V5 illustrated in FIG. 15A. When the loaded disk 110 is a dual-layered disk, the magnitude S1(2)_mag is V6 illustrated in FIG. 15B.

Next, in operation S115, the stored magnitude S1(2)_mag and the controlled magnitude S1(1)_mag (=REF) are compared with each other.

In operation S116, when the magnitude S1(2)_mag is greater than the magnitude S1(1)_mag, the loaded disk 110 is determined to be a multi-layered disk. In operation S117, when the magnitude S1(2)_mag is less than or equal to the magnitude S1(1)_mag, the loaded disk 110 is determined to be a single-layered disk.

Although spherical aberration correction is described with reference to the methods of FIGS. 10 and 11, the present invention is not limited thereto, and various aberration types such as comma aberration may be applied to the present invention.

A disk decision method according to the embodiment of the present invention may be applied to discriminate a single-layered disk and a dual-layered disk from each other and to discriminate a single-layered disk and a multi-layered disk having more than 2 layers from each other.

According to the embodiment of the present invention, a disk layer architecture is determined by detecting a change in a focus error signal that depends on a change in an aberration correction layer. Thus, even when noise such as a vibration of an optical disk drive is generated during disk discrimination, the layer architecture of a disk can be accurately determined.

In addition, the type of loaded disk is determined according to a time interval during which an S wave of a focus error signal is generated, and the layer architecture of the loaded disk is determined by detecting a change in the focus error signal that depends on a change in an aberration correction layer. Therefore, the type of loaded disk and the layer architecture thereof can be determined while minimizing an influence of noise.

In particular, the layer architecture of blue-ray disks (BDs) can be accurately determined while minimizing an influence of noise.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A disk decision method comprising:
    detecting a change in a magnitude of a focus error signal generated during a focus search for a recording layer of a disk closest to an outermost layer of the disk, wherein the change in the magnitude of the focus error signal depends on which recording layer of the disk aberration correction is performed for; and
    determining a recording layer architecture of the disk based on an amount of change in the detected magnitude of the focus error signal.

2. The disk decision method of claim 1, wherein the aberration comprises a spherical aberration.

3. The disk decision method of claim 1, wherein the detecting of the change in the magnitude of the focus error signal comprises:
    measuring a first magnitude of an S wave of the focus error signal, which is generated from the recording layer of the disk closest to the outermost layer thereof while moving an objective lens of a pickup in a direction perpendicular to a top surface of the disk, when the aberration correction has been performed for a first recording layer of a multi-layered disk;
    measuring a second magnitude of the S wave of the focus error signal, which is generated from the recording layer of the disk closest to the outermost layer thereof while moving the objective lens of the pickup in the direction perpendicular to the top surface of the disk, when the aberration correction has been performed for a second recording layer of a multi-layered disk; and
    determining a change in the magnitude of the focus error signal by comparing the first and second magnitudes.

4. The disk decision method of claim 1, wherein the detecting of the change in the magnitude of the focus error signal comprises:
    adjusting a parameter so that a magnitude of an S wave of the focus error signal, which is generated from the recording layer of the disk closest to the outermost layer thereof while moving an objective lens of a pickup in a direction perpendicular to a top surface of the disk, becomes a target value when the aberration correction has been performed for a first recording layer of a multi-layered disk;
    measuring a magnitude of an S wave of the focus error signal, which is generated from the recording layer of the disk closest to the outermost layer thereof while moving the objective lens of the pickup in the direction perpendicular to the top surface of the disk, when the aberration correction has been performed for a second recording layer of a multi-layered disk; and
    determining the change in the magnitude of the focus error signal by comparing the measured magnitude of the focus error signal with the target value.

5. The disk decision method of claim 4, wherein the parameter comprises a parameter that determines a gain of an amplifier to amplify the focus error signal.

6. The disk decision method of claim 1, wherein, in the determining of the recording layer architecture of the disk, when the magnitude of the focus error signal generated during focus search from the outermost layer of the disk to the recording layer thereof closest to the outermost layer is greater when a second recording layer of a multi-layered disk is set as a recording layer for which spherical aberration correction is performed than when a first recording layer of the multi-layered disk is set as the recording layer for which spherical aberration correction is performed, the recording layer architecture of the disk is determined to be a multi-layered architecture, and otherwise, the recording layer architecture of the disk is determined to be a single-layered architecture.

7. The disk decision method of claim 1, wherein the amount of change in the detected magnitude of the focus error signal is the amount of change between the maximum and minimum values of the magnitude of the focus error signal.

8. The disk decision method of claim 1, wherein the recording layer architecture of the disk is determined to be a multi-layered architecture or a single-layered architecture based on the amount of change in the detected magnitude of the focus error signal.

9. A disk decision method comprising:
    determining a type of a disk according to a time interval during which an S wave of a focus error signal detected while moving an objective lens of a pickup in a direction perpendicular to a top surface of the disk is generated, when a disk determination mode is enabled; and
    determining the recording layer architecture of the disk based on an amount of change in a detected magnitude of the focus error signal, which is detected during a focus search for a recording layer of the disk closest to an outermost layer of the disk, wherein the change in the magnitude of the focus error signal depends on which recording layer of the disk aberration correction is performed for.

10. The disk decision method of claim 9, wherein the aberration comprises a spherical aberration.

11. The disk decision method of claim 9, wherein, in the determining of the recording layer architecture of the disk, when the magnitude of the focus error signal generated during focus search for the recording layer of the disk closest to the outermost layer of the disk is greater when a second recording layer of a multi-layered disk is set as a recording layer for which spherical aberration correction is performed than when a first recording layer of the multi-layered disk is set as the recording layer for which spherical aberration correction is performed, the recording layer architecture of the disk is determined to be a multi-layered architecture, and otherwise, the recording layer architecture of the disk is determined to be a single-layered architecture.

12. A computer readable recording medium having recorded thereon a computer program code for a disk decision method, the method comprising:
    detecting a change in a magnitude of a focus error signal generated during a focus search for a recording layer of a disk closest to an outermost layer of the disk, wherein the change in the magnitude of the focus error signal depends on which recording layer of the disk aberration correction is performed for; and determining a recording layer architecture of the disk based on an amount of change in the detected magnitude of the focus error signal.

13. An optical disk drive to operate on a disk, the disk drive comprising:
   a pickup comprising an objective lens projecting an optical signal to the disk via the objective lens and detecting an optical signal reflected from the disk, the pickup further comprising:
   an actuator which moves the position of the objective lens according to an actuator driving control signal,
   and an aberration corrector which corrects aberration according to an aberration correction control signal;
   a signal processor processing optical signals detected by the pickup in order to generate a focus error signal;
   a disk type determination unit detecting a time interval during which an S wave of the focus error signal is generated, and determining a type of the disk according to the detected time interval, when a disk determination mode is enabled;
   a disk layer architecture determination unit detecting a change in a magnitude of the focus error signal, which is detected during a focus search for a recording layer of the disk closest to an outermost layer of the disk, and determining the recording layer architecture of the disk based on an amount of change in the detected magnitude, wherein the change in the magnitude of the focus error signal depends on which recording layer of the disk aberration correction is performed for; and
   a controller generating an actuator driving control signal to move the objective lens in a direction perpendicular to a top surface of the disk when a disk type determination mode is enabled, and generating an aberration correction control signal and an actuator driving control signal which are used to execute a focus search according to a change in a recording layer of the disk, for which aberration is corrected, when a disk layer architecture determination mode is enabled.

14. The optical disk drive of claim 13, wherein the aberration corrector comprises a spherical aberration corrector.

15. The optical disk drive of claim 13, wherein the disk type determination unit comprises:
   an analog-to-digital conversion (ADC) unit converting an analog focus error signal into a digital focus error signal;
   an S-wave detection unit detecting a point of the digital focus error signal at which the S wave is generated;
   a time measuring unit measuring a time interval between a point of time at which the S wave is detected and a point of time at which a new S-wave is detected; and
   a comparison unit comparing the measured S-wave time interval with standard S-wave time intervals set for different types of disks so as to determine the type of loaded disk.

16. The optical disk drive of claim 13, wherein the disk layer architecture determination unit comprises:
   first and second registers;
   an ADC unit converting the analog focus error signal into a digital focus error signal;
   an S wave magnitude detection unit detecting generation of the S wave by monitoring a point of the digital focus error signal at which the sign of the digital focus error signal is changed, and calculating the magnitude of the detected S wave;
   a first comparison unit comparing the calculated magnitude of the S wave with a critical value and storing information about the magnitude of a first S wave that exceeds the critical value in the first register, when the aberration corrector has corrected aberration for a first recording layer of a multi-layered disk, and comparing the calculated magnitude of the S wave with the critical value and storing information about the magnitude of a first S wave that exceeds the critical value in the second register, when the aberration corrector has corrected aberration for a second recording layer of a multi-layered disk, which is closer to the outermost layer of the disk than the first recording layer; and
   a second comparator comparing the magnitude information stored in the first register with the magnitude information stored in the second register, thereby determining the layer architecture of the loaded disk.

17. The optical disk drive of claim 16, wherein the critical value is determined to be greater than the magnitude of the S wave of the focus error signal generated by an optical signal reflected by the outermost layer of the disk and to be less than the magnitude of the S wave of the focus error signal generated by an optical signal reflected by the recording layer of the disk.

18. The optical disk drive of claim 16, wherein the second comparison unit determines the layer architecture of the disk to be a multi-layered architecture when the magnitude represented by the magnitude information stored in the second register is greater than the magnitude represented by the magnitude information stored in the first register and, otherwise, determines the layer architecture of the disk to be a single-layered disk.

19. The optical disk drive of claim 16, wherein a parameter that changes the waveform magnitude of the focus error signal is adjusted so that the magnitude information stored in the first register can become an initially set target value.

20. The optical disk drive of claim 13, wherein the controller generates the disk type determination mode when a disk is loaded on the optical disk drive or when the optical disk drive having a disk loaded thereon is turned on.

21. The optical disk drive of claim 13, wherein the controller changes an operating mode to the disk layer architecture determination mode after the disk type is determined.

22. The optical disk drive of claim 13, wherein, when the loaded disk is determined to be a blue-ray disc (BD) in the disk type determination mode, the controller changes an operating mode to the disk layer architecture determination mode.

* * * * *